United States Patent [19]

Bodendorf et al.

[11] 4,308,093

[45] Dec. 29, 1981

[54] HIGH TEMPERATURE RESISTANT COMPRESSIBLE SHEET MATERIAL FOR GASKETING AND THE LIKE

[75] Inventors: Warren J. Bodendorf, Montgomery; Thomas A. Podach, South Hadley, both of Mass.

[73] Assignee: Texon, Inc., South Hadley, Mass.

[21] Appl. No.: 99,619

[22] Filed: Dec. 3, 1979

[51] Int. Cl.$^3$ ............................................. D21H 5/18
[52] U.S. Cl. ................................... 162/152; 162/165; 162/166; 162/169; 162/181 R; 162/181 D
[58] Field of Search ............. 162/146, 145, 158, 183, 162/181 R, 181 D, 157 R, 156, 164 R, 152, 165, 166, 169; 106/308 N

[56] References Cited

U.S. PATENT DOCUMENTS

| | | | |
|---|---|---|---|
| 3,036,950 | 5/1962 | Martin | 162/145 |
| 3,109,769 | 11/1963 | Martin | 162/164 R |
| 3,567,680 | 3/1971 | Iannicelli | 106/308 N |
| 3,649,320 | 3/1972 | Yates | 106/308 N |
| 3,834,924 | 9/1974 | Grillo | 106/308 N |
| 3,847,848 | 11/1974 | Beers | 106/308 N |
| 3,957,718 | 5/1976 | Pochert et al. | 106/308 N |
| 4,143,027 | 3/1979 | Solliman et al. | 106/308 N |
| 4,225,383 | 9/1980 | McReynolds | 162/156 |

FOREIGN PATENT DOCUMENTS 45-8164  3/1970  Japan ................................. 162/183

Primary Examiner—Peter Chin

[57] ABSTRACT

A high temperature resistant compressible sheet material has a thickness of 0.001 to 1 inch and includes a crosslinked elastomer as a binder and high temperature staple fibers. A major amount of a particulate filler which has been chemically modified to coreact with the crosslinked elastomer is incorporated into the sheet material. The binder preferably has incorporated therein an addition polymerized silane coupling agent. The sheet material is fabricated according to papermaking techniques. The sheet material is useful in the fabrication of gasketing and in heat shields.

23 Claims, No Drawings

HIGH TEMPERATURE RESISTANT COMPRESSIBLE SHEET MATERIAL FOR GASKETING AND THE LIKE

BACKGROUND OF THE INVENTION

This invention relates to high temperature resistant compressible sheet material useful as gasketing and heat shields and more particularly to high temperature resistant compressible sheet material using a crosslinked elastomer as the binder.

DESCRIPTION OF THE PRIOR ART

Flexible compressible sheet material has been extensively used in gasketing applications. Typically, the sheet material has a thickness between 0.001 to ¼ of an inch for use in the fabrication of gaskets. The sheet material is either used alone or as a component of a composite gasket. For example, a gasket for sealing the base of a carburetor to the intake manifold of an internal combution engine is formed by placing the sheet material on or between one or two sheets respectively of thin metal to form a composite gasket. Further, gaskets used in connection with internal combustion engines are sometimes required to withstand extremely high temperatures, i.e. on the order of greater than 500° F. and sometimes as much as 900° F. For example, the exhaust manifold gaskets, the supercharger gaskets, the gaskets for exhaust systems and head gaskets and those required in connection with catalytic converters must have high temperature resistance. Further, these gaskets must be resistant to oil and water, both of which will contact the gasket when used in connection with an internal combustion engine. With respect to water resistance, this is a particularly important characteristic when used in the fabrication of water pump gaskets.

Further, water resistance becomes an even greater requirement of gasketing material when the gasket is used in connection with marine engines and more particularly in outboard motors.

By far, asbestos has found the most use as the fibrous component in gasketing material primarily because of its high temperature resistance. However, because of the toxicity of asbestos, substitutes have been sought which would effectively eliminate the need to use asbestos in gasketing materials.

Fiberglass in the form of microfibers and ceramic fibers has been utilized in connection with forming compressible sheet materials for use in gasketing material. Further, in order to retain structural integrity during conversion of the sheet material to gasketing and in use, it is necessary to provide a binder which possesses those characteristics. Typically, these binders are elastomeric in nature. Further, the binders should have some degree of heat resistance since they will come in contact with high temperature environments when placed in service. The sheet material must also be compressible and nonporous to form an effective seal between passages which are in fluid communication.

In accordance with the present invention a sheet material formed on standard papermaking apparatus is provided which maintains its integrity under high temperature conditions and is resistant to both water and oil when used as a gasket.

Further, the sheet material according to the invention may be used as a heat shield to isolate various areas from heat generating sources such as a floor underlay in a car or trunk.

Still further, the sheet material according to the invention has a plurality of uses where high temperature characteristics are required.

BRIEF DESCRIPTION OF THE INVENTION

A high temperature resistant compressible sheet material has a thickness of 0.001 to 1 inch and includes a crosslinked elastomer as a binder and high temperature staple fibers. A major amount of a particulate filler which has been chemically modified to coreact with the crosslinked elastomer is incorporated into the sheet material. Preferably, the binder includes a silane coupling agent addition polymerized therein. The sheet material is fabricated according to papermaking techniques. The sheet material is useful in the fabrication of gasketing and in heat shields.

The binder is constituted of a crosslinked elastomer to provide the required compressibility and integrity to the composite sheet material. The term "elastomer", as used herein, is intended to mean and include both synthetic and natural rubber. "Natural rubber," as used herein, is the elastic solid obtained from the sap or latex of the Havea tree, the major constituent being the homopolymer of 2-methyl-1,3-butadiene (isoprene). "Synthetic rubber," as used herein, is meant to encompass polymers based upon at least 2 percent of a conjugated unsaturated monomer, the conjugation being in the 1,3 position in the monomer chain and the final polymer in its uncured state having an extensibility of at least 200 percent and a memory of at least 90 percent when stretched within the extensibility limits and released instantaneously. The conjugated unsaturated monomers which are used in the preparation of synthetic rubber are, but not limited to, chloroprene, butadiene, isoprene, cyclopentadiene, dicyclopentadiene, and the like. Other olefins capable of free radical anionic or cationic addition polymerization into the polymer chain with a conjugated unsaturated monomer are useful in forming synthetic rubbers. These olefins are typically monoethylenically unsaturated monomers. "Monoethylenically unsaturated", as used herein, is characterized by the monomer having a $>C=CH_2$ group. These monoethylenically unsaturated monomers are but not limited to the acrylic monomers such as methacrylic acid, acrylic acid, acrylonitrile, methacrylonitrile, methylacrylate, methylmethacrylate, ethylacrylate, ethylmethacrylate, acrylamide, and the like; olefinic hydrocarbons such as ethylene, butylene, propylene, styrene, alpha-methylstyrene and the like, and other functional unsaturated monomers such as vinyl pyridine, vinyl pyrollidone and the like.

The elastomers preferred in the practice of the invention are those based upon synthetic rubber and containing preferably butadiene and acrylonitrile. It is also preferred that the elastomer have incorporated therein sites for condensation crosslinking. These sites for condensation crosslinking are typically acid groups imparted by acrylic acid, hydroxyl groups imparted by hydroxyethylacrylate, N-methylol groups imparted by N-methylolacrylamide and the like. These condensation crosslinking sites are required in order to condensation interpolymerize the various polymer chains to form a crosslinked network as a tenacious and compressible binder material.

In incorporating the elastomer into the sheet material it is desired that the elastomer be in latex form by means of an anionic surface active agent or emulsifier. Typically, these latices are provided as 40 to 60 percent solids in water. Preferably, a typical latex will have an elongation of between 800 to 1200 in the uncured state and 250 to 750 in the cured state.

Although the elastomers useful in the practice of the invention may be provided with sufficient functional groups to self-crosslink, i.e. crosslink without the addition of other materials, crosslinking agents may be added to provide the required crosslinking characteristics.

Crosslinking agents suitable in the practice of the invention include aldehydes such as formaldehyde, glyoxal, acrolien and the like; synthetic resin precondensates obtained by the reaction of an aldehyde generally with compounds containing nitrogen like dimethylol urea, dimethylolethylene urea, di- and trimethylol triazon dimethyluron, di- and trimethylol melamine and other cyclic or noncyclic, water soluble or non-water soluble precondensates of urea and melamine formaldehyde. The reactive methylol groups may be blocked or partially blocked by alcohols having 1 to 4 carbon atoms. Apart from the above, other known crosslinking agents too may be used such as diepoxides and epichlorin derivatives thereof, dichlorophenols, beta substituted diethyl sulfones, sulfonium salts, N-methylolacrylamide and methylacrylamide and derivatives thereof, diisocyanates and the like. Up to 4 percent of the crosslinking agent may be incorporated into the sheet material. Too much crosslinking agent may render the sheet material too brittle or hard and not provide the required compressibility for the gasket material.

Typically, the elastomeric binder composes about 8 to 65 percent by weight of the sheet material, and more preferably, 8 to 35 percent by weight based on the weight of the sheet material.

In addition to the elastomeric component of the binder a minor amount of non-elastomeric organic addition polymer such as an acrylate may be added to form the binder material, i.e. up to about 30 percent by weight, and more preferably less than 15 percent by weight. It is desirable to limit the amount of non-elastomeric polymer in relation to the elastomer elsewise the final sheet material will not have the required compressibility to be useful in forming gaskets. The non-elastomeric polymer is typically formed by the free radical, anionic or cationic addition polymerization of unsaturated monomers. The unsaturated monomers are monoethylenically unsaturated monomers and characterized as previously described. These monomers are typically acrylic acid, methacrylic acid, acrylonitrile, methacrylonitrile, methylmethacrylate, methylacrylate, ethylacrylate, ethylmethacrylate, acrylamide, N-methylolacrylamide and the like. Preferably, just as in the case of the elastomers, the non-elastomeric polymer contains the crosslinking groups as previously described. Further, the non-elastomeric polymer is incorporated into the sheet material as a latex which is supplied at a solids level of about 40 to 60 percent by weight in water as an aqueous emulsion.

In a most preferred embodiment of the invention a silane coupling agent having a reactive addition polymerizable double bond may be copolymerized in the elastomer or in the non-elastomeric polymer. Typically, the addition polymerizable silane coupling agents have acrylate or methacrylate polymerizable groups thereon for incorporation into the binder along with hydrolyzable groups for reaction with the fibrous constituents of the sheet material. Preferably, the silane coupling agents are vinyl triethoxy silane, 8-methacryloxypropyltrimethoxy silane, vinyl tris(betamethoxyethoxy) silane and the like.

The silane coupling agent monomer should be incorporated into the elastomeric or non-elastomeric polymer at a level of 2 to 15 percent by weight based on the weight of the total binder and more preferably 3 to 12 percent by weight.

The fibers useful in the practice are those capable of withstanding elevated service temperature and are of staple length. "Staple" fibers are those having a discrete length of up to 8 inches and more preferably 4 inches in length and adapted to be processed on standard papermaking equipment.

Generally the fibers are those capable of continuous service temperatures in excess of 1500° F. These fibers are characterized as ceramic fibers and are formed of metal oxides which are resistant to high temperatures. Typically, the high temperatures are composed of alumina, silica, aluminum silicate and combinations thereof along with quartz and the like.

Typically and preferably, the fiber diameters are less than 5 microns as the mean diameter, and preferably less than 4 microns as the mean diameter. The fibrous component constitutes 15 to 50 percent by weight based on the weight of the sheet material and more preferably 20 to 30 percent by weight based on the weight of the sheet material.

In addition to those fibers which are capable of continuous service temperatures in excess of 1500° F., lower temperature inorganic fibers may be used, i.e. those which are capable of withstanding 900° F. continuous service temperature but less than 1500° F. continuous service temperatures. Exemplary of these fibers are what is known as the glass microfibers, i.e. those having fiber diameters of beta, A, AA, AAA, AAAA, and AAAAAA diameter. These glass fibers may be of typical glass compositions known as E-glass, T-glass, C-glass, SF-glass and S-glass as is sold by the Owens Corning Corporation.

These glass fibers can be present in the sheet material at a level of up to 8 percent by weight based on the weight of said material and preferably at less than 5 percent by weight based on the total weight of the material. If greater than 8 percent of the glass fibers or the like are used, substantial high temperature degradation will be encountered.

The particular fillers useful in the practice of the invention are those which have been modified to co-react with the crosslinked elastomer. Preferably, these particular fillers are inorganic in nature and the chemical modification has been by way of a silane coupling agent or Werner complex coupling agent. Typical particulate fillers are clay which can be kaolinite, halloysite, montmorittonite and illite. Other fillers such as quartz, calsite, luminite, gypsum, muscavite and the like may also be used. The clays which have been modified with the coupling agent are those modified by the dual functional coupling agents such as silicone containing organic compound or Werner complex which establishes a bond with the inorganic filler through the metal atom and a bond with the organic binder through the organic radicals attached to the metal atom. Typically useful modifiers in the form of silane coupling agents are, but not limited to: gamma-aminopropyltriethoxysilane, N-bis(betahydroxyethyl)-gamma-aminopropyltriethoxysilane, N-beta(aminoethyl-gamma-aminopropyltrimethoxy)silane, $(CH_3O)_3Si(CH_2)_3NH(CH_2)_2NH(CH_2)_2COOCH_3$, gamma-glycidoxypropyltrimethoxysilane, vinyl-triacetoxysilane, gamma-methacryloxypropyltrimethoxysilane, vinyl-triethoxysilane, vinyl-tris(beta-methoxyethoxy)silane, beta-3,4-epoxycyclohexyl(ethyltrimethoxy)silane, gamma-thiopropyltrimethoxysilane and the like. Preferably, the coupling agent used to modify the particulate filler is an amino silane or a mercapto silane, and most preferably a mercapto functional silane.

Preferably, the particle size desired in the filler is under 5 microns, and preferably a substantial portion thereof under 2 microns, and most preferably under 1 micron. One particularly useful filler has been found to be Nucap 190 which is a mercapto silane functional modified kaolin clay. The particulate filler is incorporated into the sheet material at a level of 15 to 70 percent by weight and more preferably at a level of 40 to 60 percent by weight.

In forming the sheet material of the invention most advantageously standard papermaking apparatus is used such as a fourdrinier and inclined fourdrinier, a cylinder machine, a rotoformer and the like. A typical process involves charging the fibrous constituents and the filler to a pulper and dispersing them in water. The fiber dispersion is then charged to the machine chest of a fourdrinier papermaking machine. The fibrous component along with the filler are agitated with a major amount of water and a cationic polyelectrolyte in a minor amount is added to the admixture of the fibers and the filler. Typically, the cationic polyelectrolyte is a polymer having free amine groups such as a polyamine or the like. The cationic polyelectrolyte imparts a heavy charge on the fibers causing them to separate and be homogeneously dispersed in the water. To the dispersion is then charged a mixture of the crosslinking agent, if used, and the elastomeric and non-elastomeric emulsions. If a non-elastomeric latex is used which contains a silane coupling agent reacted therein, it should be charged first in order to provide intimate contact of the silane on the surface of the fibers. The elastomer and crosslinking agent are deposited on the surface of the fibers.

An addition of an anionic colloid is charged to redisperse the fibers and to form a homogeneous dispersion of fibers having elastomer and non-elastomer and crosslinking agent coated thereon. From the machine chest the homogeneous mixture is piped towards the papermaking machine. Prior to the time it reaches the head box of the papermaking machine, a cationic polyelectrolyte is charged in line with the dispersion which causes the coated fibers to flocculate, thus providing a flocculant at the head box. The flocculant is transferred onto the moving wire of the fourdrinier and the water is allowed to drain therefrom. After the draining of the water by gravity, suction is applied to the wet web to further remove water from the web. The web is then pressed between felt rolls and then pressed between a metal roll and a felt roll and dried. The drying temperature required is between 200° and 350° F. During the drying cycle the elastomer is crosslinked and the modified filler is chemically integrated into the sheet material. The sheet material is then calendered to a uniform thickness and is taken up on rolls which can be subsequently unwound and cut into gasketing or other high temperature resistant material. In addition to the constituents previously described, other known materials may be added. For example, Werner complexes of hydrophobic acids may be added to the dispersion to impart hydrophobic properties to the fibers.

The following examples will further illustrate the process of practicing the invention along with specific compositions useful in forming the sheet material.

EXAMPLE 1

A furnish having the following composition was prepared.

| Ingredient | Amount Parts by Weight | Solids (percentage) |
| --- | --- | --- |
| Water A | 32000 | — |
| Fiberfrax H[1] ceramic fiber | 244 | 22.83 |
| Glass microfiber[2] | 28 | 2.62 |
| Mercapto silane[3] modified clay | 486 | 45.47 |
| Stearato chromic chloride complex 29% solids in isopropanol | 28 | 0.86 |
| Lufax 290[4] (3% dispersion) | 100 | 0.28 |

[1]Fiberfrax H is manufactured by the Carborundum Company and is 62% $AL_2O_3$ and 38% $S_1O_2$, has a continuous use limit of 1427° C., a melting point above 1927° C., a mean fiber diameter of 2-3μ, and a fiber length of up to 2".
[2]The glass microfiber was John Mansville Code 112 microfiber.
[3]The mercapto silane modified kaolin clay was Nucap 190 sold by Huber Co. and having a mean particle diameter of 0.3μ.
[4]Lufax 290 is a cationic polyelectrolyte sold by Rohm and Haas.

| Ingredient | Amount Parts by Weight | Solids (percentage) |
| --- | --- | --- |
| Poly M 100[5] (48% solids latex) | 294 | 13.19 |
| Melamine formaldehyde resin[6] (67% solids in water) | 6.7 | 0.41 |
| Water B | 300 | |
| Acrylic/acrylonitrile latex[7] (48% solids in water) | 294 | 13.19 |
| Melamine formaldehyde resin[6] | 6.7 | 0.41 |
| Water C | 300 | |
| Lufax 290[4] | 50 | 0.19 |
| Deacetylated Karaya gum[8] (1% solids in water) | 60 | 0.56 |

[5]Poly M 100 is a latex sold by Polymerics, Inc. having 12% of a hydrolyzable silane acrylate polymerized therein, along with acrylic acid, acrylonitrile, N-methylol acrylamide and alkyl acrylates and is non-elastomeric.
[6]The melamine formaldehyde resin is sold under the trade name Resimene 842 by Monsanto Co.
[7]The acrylic/acrylonitrile latex is sold by Polymerics, Inc. under the name Poly M-410. It has a % elongation of 1020 uncured and 440 cured and is self-crosslinking.
[8]The deacetylated Karaya gum is an anionic colloid.

The water A along with the ceramic fiber and glass microfiber were charged to a pulper which was run 5 minutes and then pumped into the machine chest which was in communication with a fourdrinier papermaking machine. The mercapto silane modified clay was added to the machine chest and the mixture was agitated for 10 minutes. Agitation was continued in the machine chest for the remaining portion of the charging. The following ingredients were added in sequence: the stearato chromic chloride complex; the Lufax; a mixture of the Poly M 100, melamine formaldehyde and the water B; a mixture of the acrylic/acrylonitrile latex, melamine formaldehyde and water C; and the addition of deacetylated Karaya gum dispersion.

After a uniform dispersion in the machine chest had been achieved the dispersion was pumped towards the head box of the fourdrinier. Prior to entry into the head box the Lufax solution was metered through the fan pump in order to flocculate the fiber dispersion. The flocculant was fed onto the moving screen of the fourdrinier, water was allowed to drain by gravity, and then suction was applied. The wet web was then passed through two felt to felt presses and one roll to felt press and passed through the driers which were at approximately 280° F. The process was carried out to produce a final sheet having a thickness of 0.0087 inches. After drying the sheet had the following characteristics:

| | |
|---|---|
| Gauge in inches | .0087 |
| Basis weight, lbs./480 ft.$^2$ | 21.3 |
| Basis weight, grms./dcm$^2$ | 2.17 |
| Density, lbs./ft.$^3$ | 61.2 |
| Tensile, psi | |
| (1) Machine direction | 1102 |
| (2) Cross direction | 709 |
| % compression, 5000 psi | 52 |
| % initial recovery | 59 |

The compressibility and recovery of the sheet material were measured in accordance with ASTM designation F36-66 (1973).

The gasket material was then tested in accordance with ASTM designation F39-59 (1974) at 150° C. for 5 hours in No. 3 oil. The results of the tests were as follows:

| | |
|---|---|
| % gauge change | −1.75 |
| % weight increase | +21 |
| % compression 5000 psi | 51 |
| % initial recovery | 30 |
| % tensils change | |
| (1) Machine direction | +3.9 |
| (2) Cross direction | +15 |

EXAMPLES 2-9

Example 1 was repeated using the identical composition thereof except that the process was carried out to produce a number of desired thicknesses. Table I reports the test results of the gasketing material obtained in accordance with Examples 1-9.

Further, tests have been run which show that the gasketing material is excellent in marine applications and in high temperature automotive applications.

In another application for the heat resistant material of the present invention it has been found to demonstrate insulating characteristics when used as a heat shield and the like in isolating high temperature components from necessarily low temperature operating components in automobiles. Thus, in an automobile, it is an excellent material to provide a heat shield between a catalytic converter which operates at extremely high temperatures to isolate it from the frame and body portions and appurtenant components in the undercarriage of an automobile. Further, it is useful in the firewall of an automobile to isolate the engine compartment from the passenger compartment.

Thus, although the invention has been described with reference to specific processes and specific materials, it is only to be limited so far as is set forth in the accompanying claims.

We claim:
1. A high temperature resistant compressible water laid sheet material having a fibrous constituent and a thickness of 0.001 to 1 inch comprising:
 (a) 8 to 65 percent by weight of a binder including a crosslinkable elastomer and a silane coupling agent copolymerized within said binder at a level of at least about 2 percent by weight;
 (b) a crosslinking agent for said elastomer;
 (c) 15 to 70 percent by weight of a inorganic particulate filler which has been chemically modified to coreact with the crosslinked elastomer; and
 (d) 15 to 50 percent by weight of high temperature nonasbestos staple fibers;
 said material capable of withstanding service temperatures of 500° F. and being oil and water resistant.
2. The material of claim 1 wherein said particulate filler is present at a level of 40 to 60 percent by weight based on the total weight of said material.
3. The material of claim 1 wherein the particulate filler is a clay.
4. The material of claim 1 wherein said particulate

TABLE I

| Example No. | 2 | 3 | 4 | 5 | 6 | 7 | 8 | 9 |
|---|---|---|---|---|---|---|---|---|
| Gauge, in. | .0163 | .023 | .023 | .031 | .018 | .031 | .022 | .018 |
| Basis wt., lbs/480 ft$^2$ | 42.7 | 62.5 | 66.5 | 94 | 47.6 | 90 | 63.9 | 53 |
| Basis wt., grms dcm$^2$ | 4.3 | 6.3 | 6.75 | 9.5 | 4.85 | 9.1 | 6.5 | 5.4 |
| Density, lbs/ft$^3$ | 65.6 | 68 | 72.2 | 73.8 | 66 | 72 | 72 | 72.6 |
| Tensile, psi, machine | | | | | | | | |
| direction | 1179 | 987 | 799 | 1102 | 1099 | 935 | 923 | 790 |
| cross direction | 854 | 722 | 784 | 833 | 950 | 757 | 730 | 625 |
| % compression, 5000 psi | 47.8 | 52.9 | 39.3 | 37.9 | 43.48 | 34.75 | 37.8 | 39.9 |
| % initial recovery | 47.7 | 50.5 | 38.3 | 32.2 | 48.3 | 36 | 40 | 47 |
| Testings in oil/5 hrs. 150° C. | | | | | | | | |
| % gauge change | +1.8 | +2.55 | +7.7 | +3.3 | +3.1 | +2.35 | +2.45 | +3.45 |
| % weight increase | +23.2 | +25.6 | +25.9 | +20.3 | +22.6 | +22.3 | +22.55 | +20.9 |
| % compression 5000 psi | 39.4 | 44.2 | 34 | 31 | 33 | 27.7 | 29 | 29 |
| % initial recovery | 37.8 | 30.9 | 26 | 17 | 22.3 | 13.5 | 11 | 10.6 |
| % tensile change | | | | | | | | |
| machine direction | +14 | +.44 | +17.9 | +13.7 | +16.6 | +9.3 | +10.9 | +27.4 |
| cross direction | +23 | +12.6 | +14.5 | +19.4 | +20 | +21 | +19.8 | +24 |

Surprisingly, there was an increase in tensile strength after testing the gasket material in oil at high temperature where in normal gasketing materials there is a decrease in strength. Further, the material substantially maintains its compressibility after the oil emersion test which makes it ideal for high temperature gasketing material.

filler has been modified by a coupling agent.
5. The material of claim 4 wherein said coupling agent is a silane coupling agent.
6. The material of claim 5 wherein said silane coupling agent is selected from the group consisting of an amino functional silane coupling agent and a mercaptofunctional silane coupling agent.

7. The material of claim 1 wherein the silane coupling agent is addition copolymerized with the elastomer.

8. The material of claim 1 having a thickness of 0.001 to ¼ inch.

9. The method of claim 1 wherein said elastomer has acrylonitrile polymerized therein.

10. The method of claim 1 wherein said elastomer is present at a level of 8 to 35 percent by weight based on the weight of said sheet material.

11. The method of claim 1 wherein said binder includes 8 to 30 percent by weight of a crosslinkable nonelastomeric polymer.

12. The material of claim 1 including a silane coupling agent copolymerized with said elastomer.

13. The material of claim 11 including a silane coupling agent copolymerized with said non-elastomeric polymer.

14. The material of claim 1 wherein said crosslinking agent is selected from the group consisting of melamine formaldehyde resins, urea formaldehyde resins and resorcinol formaldehyde resins.

15. The material of claim 1 wherein said crosslinking agent is present at a level of 0.7–4 percent by weight based on the weight of said material.

16. The material of claim 1 wherein said high temperature staple fibers are inorganic.

17. The material of claim 1 wherein said high temperature fibers are capable of withstanding 1500° F. continuous service temperature.

18. The material of claim 17 wherein said fibers are composed of alumina/silica fibers.

19. The material of claim 1 wherein said fibers are present at a level of 20 to 30 percent by weight.

20. The material of claim 17 including a minor amount of fibers which are capable of withstanding 900° F. but not 1500° F. continuous service temperature.

21. The material of claim 20 wherein said fibers capable of withstanding 900° F. are glass microfibers.

22. The material of claim 20 wherein said fibers capable of withstanding 900° F. are present at a level of up to 8 percent by weight based on the weight of said material.

23. A high temperature resistant compressible water laid sheet material having a thickness of 0.001 to 1 inch comprising:
   20 to 30 percent by weight of inorganic nonasbestos staple fibers having a service temperature in excess of 1500° F.;
   up to 8 percent by weight of inorganic staple fibers having a service temperature greater than 900° F. but not in excess of 1500° F.;
   20 to 30 percent by weight of a crosslinked elastomeric binder having a silane coupling agent polymerized therein at a level of at least about 2 percent by weight; and
   40 to 50 percent by weight of an inorganic filler which has been modified to coreact with said elastomeric binder;
   said material capable of withstanding continuous service temperatures in excess of 500° F. and being oil and water resistant.

* * * * *

UNITED STATES PATENT AND TRADEMARK OFFICE
CERTIFICATE OF CORRECTION

PATENT NO. : 4,308,093

DATED : December 29, 1981

INVENTOR(S) : Warren J. Bodendorf et al.

It is certified that error appears in the above–identified patent and that said Letters Patent are hereby corrected as shown below:

Column 1 Line 22 "combution" should read --combustion--.

Column 7 Line 33 "tensils" should read --tensile--.

Column 7 Line 42 "1-9." should read --2-9.--.

Claim 9 Column 9 Line 5 delete "method" and insert --material--.

Claim 10 Column 9 Line 7 delete "method" and insert --material--.

Claim 11 Column 9 Line 10 delete "method" and insert --material--.

Signed and Sealed this

Seventeenth Day of July 1984

[SEAL]

Attest:

Attesting Officer

GERALD J. MOSSINGHOFF

Commissioner of Patents and Trademarks